United States Patent Office 3,495,645
Patented Feb. 17, 1970

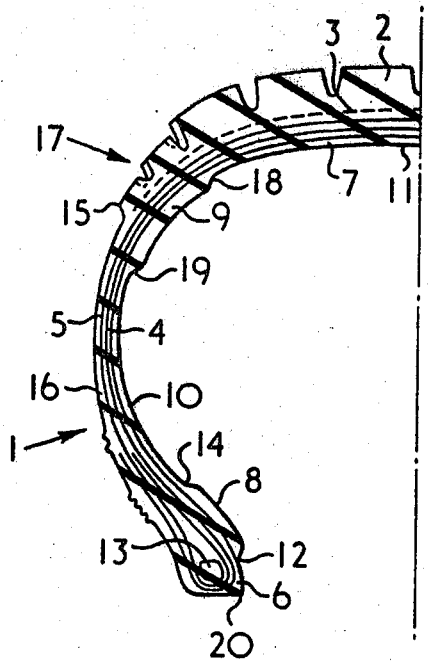

3,495,645
PNEUMATIC TIRES
Vernon Eric Gough, Sutton Coldfield, England, assignor to The Dunlop Company Limited, London, England, a British company
Filed Aug. 3, 1967, Ser. No. 658,276
Claims priority, application Great Britain, Aug. 10, 1966, 35,730/66
Int. Cl. B60c 15/00
U.S. Cl. 152—330                     13 Claims

ABSTRACT OF THE DISCLOSURE

A radial-ply pneumatic tire having a rubber inner liner which is thickened in or near the bead regions and the shoulder regions of the tire. At least part of the thickened portions may be harder and up to five times as thick as the remainder of the liner.

---

This invention relates to an improved construction of pneumatic radial ply tires, that is, tires wherein each carcass comprises one or more layers of parallel cord material wherein the cords of the or each layer are disposed at an angle of between 75° and 90° to the mid-circumferential plane of the tire.

According to the present invention there is provided a radial-ply pneumatic tire comprising a carcass, a bead region, a tread and one or more breaker layers and an inner liner located radially inwardly of the radially-innermost carcass ply, the liner being of a greater thickness in a region of the tire other than the mid-sidewall and crown regions thereof when considered in transverse cross-section than in said mid-sidewall and crown regions.

The liner may be of a greater thickness in either the shoulder region of the bead region of the tire than in the mid-sidewall and crown regions thereof, or, alternatively, the liner may be of a greater thicknes in both of these regions than in the mid-sidewall and crown regions of the tire. The thickened shoulder portion of the liner may lie between a circumferential line one quarter of the breaker width axially inwards of the shoulder measured along the curved section of the tire and a circumferential line one quarter of the distance from the shoulder towards the bead region measured along the curved sidewall. The thickened bead portion of the liner may lie between the bead toe of the tire and a circumferential line one third of the distance from the bead toe towards the shoulder measured along the curved sidewall. The material of the liner may comprise natural rubber, chlorobutyl or styrene butadiene rubber and in all or part of said thickened regions is equal in hardness to, or harder than, the remainder of the liner in the mid-sidewall and crown regions of the tire.

Embodiments of the invention will now be further described in more detail with reference to the accompanying drawing of a section of a tire constructed according to the invention by way of example.

In a first construction a pneumatic tire 1 for a car comprises a tread portion 2, one of more substantially circumferentially-inextensible breaker layers 3 and a carcass comprising two plies 4 and 5 of rubberised parallel cord material wherein the cords in the one ply extend from one bead region 6 of the tire to the other at an angle which is equal, but in the opposite sense, to the angle the cords in the other ply make with the mid-circumferential plane of the tire, said angle being 85°. The tire also comprises, in accordance with the invention, an inner liner 7 comprising a calendered sheet of natural rubber in intimate contact with the radially-inner surface of the radially-innermost carcass ply.

The inner liner is locally thickened at the beard and shoulder regions of the tire, said thickened portions 8 and 9 projecting inwardly of the liner beyond the un-thickened regions 10 and 11 of the liner in the mid-sidewall and crown regions of the tire. In this construction thee inner liner is of equal hardness in said thickened regions to said mid-sidewall and crown regions and has a value of 75° B.S.H. The thickness in the mid-sidewall region is 2 mm., whilst the thickness of said bead and shoulder regions of the liner is 7 mm. The thickened bead regions 8 of the liner extend radially outwardly from a circumferential line 12 radially outwardly of the bead wire 13 to a circumferential line 14 one quarter of the distance between the bead region 6 and the shoulder 15 measured along the curved sidewall 16 whilst the thickened shoulder region 9 of the liner lies radially and axially inwards of the shoulder regions 17 between two circumferential lines, the first 18 a distance one sixth of the breaker width axially inwards from the shoulder region 17 measured along the curved section and the second 19 on the sidewall radially inwards from the shoulder 15 one twelfth of the distance between the shoulder and the bead toe 20 measured along the curved sidewall.

In this construction the desired locally thickened form of the inner liner is produced by calendering the natural rubber sheet comprising the liner between two suitably profiled calender rolls.

In an alternative construction the required profile of the liner is produced by extrusion of the natural rubber sheet through a suitably profiled extruder die.

In a further alternative construction the locally thickened bead and shoulder regions of liner are produced by building up the required thickness in a plurality of calendered rubber strips which, may be located upon both or either of the radially-inner or the radially-outer surface of the liner in the bead and shoulder regions of the tire.

Whilst the inner liner in the constructions hereinbefore described has been formed of natural rubber it may equally advantageously be formed of chlorobutyl or styrene butadiene rubber or any combination of these. The hardness of the liner in the aforesaid thickened regions thereof or a part thereof is equal in hardness to, or harder than, the remainder of the inner liner in the mid-sidewall and crown regions of the tire; for example, the hardness of the thickened regions may be within the range 60° B.S.H. to B.S.H. The relative thickness of said thickened regions compared with the un-thickened region of the liner may, of course, be varied; for example, the thickness of said thickened regions may be five times the thickness of the liner in the mid-sidewall and crown regions of the tire.

Although the constructions described above relate to a thickening of the liner in both the bead and shoulder regions of the tire to produce the advantages further described herein, some advantage may be gained in a tire wherein the inner liner is thickened in only the bead regions or only the shoulder regions.

A radial ply tire provided with an inner liner constructed in accordance with the invention leads to a reduction in vibration transmitted to the wheel on which the tire is mounted from the vibration which is generated in the tire by engagement of the ground-contacting surface of the tire with the surface upon which the tire is running, the resultant audible vibration in the vehicle also being reduced. A further advantage to be gained with such a construction is that there is a reduction of the surge which normally occurs when a high driving torque is transmitted through the tires, such surging normally causing a vehicle to which such a tire is fitted to accelerate in an uneven manner, although it should be appreciated that the compound from which the liner is manufactured itself may have no particular damping properties.

Having now described my invention, what I claim is:

1. In a radial ply pneumatic tire having a breaker, a bead region, a tread, a carcass, and an inner liner located radially inwardly of the radially innermost carcass ply, the improvement comprising the inner liner being of greater thickness in the regions disposed one on each side of a mid-sidewall region thereof when considered in transverse cross-section, than in the mid-sidewall and the crown region of the inner liner 2. A pneumatic tire according to claim 1 wherein the inner liner is thicker in the shoulder region of the tire than it is in the remaining region of the tire.

3. A pneumatic tire according to claim 2 wherein the thickened shoulder portion of the inner liner lies between two circumferential lines, one located one quarter of the breaker width axially inwards of the tire shoulder measured along the curved section of the tire and the other located one quarter of the distance from the shoulder towards the tire bead region measured along the curved section.

4. A pneumatic tire according to claim 1 wherein the inner liner is thicker in the bead region of the tire than it is in the remaining regions of the tire.

5. A pneumatic tire accordng to claim 4 wheren the thickened bead portion of the inner liner lies between the bead toe and a circumferential line one third of the distance from said bead toe towards the shoulder measured along the curved sidewall of the tire.

6. A pneumatic tire according to claim 1 wherein the thicker region of the inner liner is of thickness from twice to five times that of the remainder of the liner.

7. A pneumatic tire according to claim 1 wherein at least part of the inner liner is composed of natural rubber.

8. A pneumatic tire according to claim 1 wherein at least part of the inner liner is composed of chlorobutyl rubber.

9. A pneumatic tire according to claim 1 wherein at least part of the inner liner is composed of styrene butadiene rubber.

10. A pneumatic tire according to claim 1 wherein at least part of the thickened region of the inner liner is of the same hardness as the remainder of the inner liner.

11. A pneumatic tire according to claim 1 wherein at least part of said thickened region is harder than the remainder of the inner liner.

12. A pneumatic tire according to claim 1 wherein the hardness of at least part of the thickened region is between 60° B.S.H. and 90° B.S.H.

13. A pneumatic tire according to claim 1 wherein at least part of said thickened region of the inner liner is built up by at least one rubber strip.

References Cited

UNITED STATES PATENTS

| | | | |
|---|---|---|---|
| 3,062,257 | 11/1962 | Campbell | 152—354 |
| 3,253,635 | 5/1966 | Travers | 152—354 |
| 3,292,681 | 12/1966 | Travers | 152—354 |

ARTHUR L. LA POINT, Primary Examiner

CHARLES B. LYON, Assistant Examiner

U.S. Cl. X.R.

152—360, 374